July 4, 1939.    F. M. CLARK    2,165,091

ELECTRIC CAPACITOR AND COMPOSITIONS THEREFOR

Filed June 16, 1936

Inventor:
Frank M. Clark,
by Harry E. Dunham
His Attorney.

Patented July 4, 1939

2,165,091

UNITED STATES PATENT OFFICE 2,165,091

ELECTRIC CAPACITOR AND COMPOSITIONS THEREFOR

Frank M. Clark, Pittsfield, Mass., assignor to General Electric Company, a corporation of New York Application June 16, 1936, Serial No. 85,520

18 Claims. (Cl. 175—315)

The present application is a continuation-in-part of my prior application, Serial No. 57,932, filed January 7, 1936 and the invention thereof comprises improved composition suitable for use in electric capacitors, rectifiers and the like.

It is the object of my present invention to provide compositions having high thermal stability in addition to being otherwise well suited in physical and chemical properties for use as electrolytes in capacitors and other electrolytic devices.

In accordance with one of the main features of my invention the base of such electrolytes comprises as a preponderant ingredient a neutral organic compound of the character of an amide constituting an essential ingredient which functions as a carrier medium for one or more ionogens.

The amides by themselves are not suitable for use as current-conducting media in electrolytic capacitors. However, when an amide, or a combination of amides, is associated with one or more compatible ionogens, a composition suitable for use as an electrolyte results. For example, ammonium borate, sodium phosphate, sodium borate or in general salts of an acid containing an oxygen atom in its acid radical constitute compatible film-forming, or film-maintaining, ionogens. Salts of organic acids such as the oxalates, tartrates, or lactates of an alkali metal are suitable for use as ionogens. For the purposes of this invention the radical ammonium, $NH_4$, functions as an alkali metal and hence is to be considered as included when the term "alkali" is used herein.

In some instances the amide may be associated with an organic acid or salt of an organic acid, preferably such as acetic, propionic, crotonic or lactic acids or acid containing less than 5 carbon atoms per molecule. Higher carbon containing acids such as stearic acid are of possible use in such combination, but in general are less compatible with the amide. The latter amide compositions are of a plastic or pasty nature and are of relatively high electrical resistivity.

Figure 1:
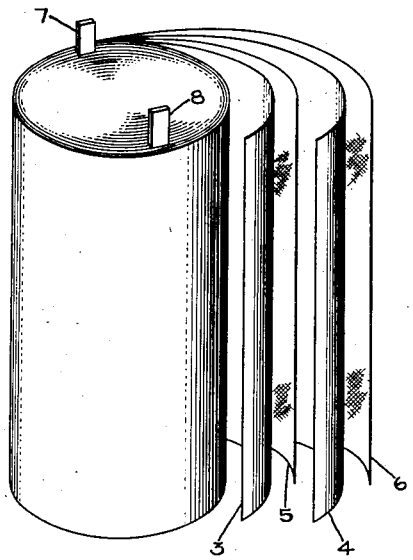
Figure 2:
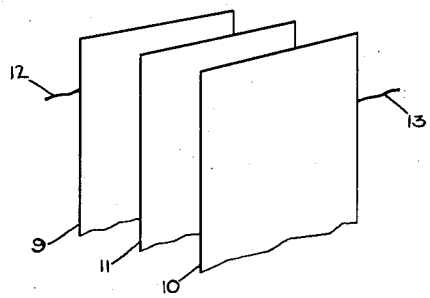

The accompanying drawing shows in Fig. 1 a side elevation of roller type of capacitor (shown partly unrolled) and Fig. 2 a diagrammatic view of a stack type capacitor.

A product, which will be designated as the first example of my invention, is prepared by introducing ammonia gas into a mixture of 32 parts lactic acid, 36 parts boric acid and 32 parts acetamide, (parts herein all being by weight). Ammonia gas is introduced until a pH value of approximately 7 to 8 characterizes the mixture. By the neutralization of the acids there is obtained (besides the acetamide) a mixture of ammonium borate and ammonium lactate. The mixture of these ingredients is a thin liquid solidifying below room temperature. The resulting liquid product has an electric resistance of 57 ohms per centimeter cubed at 90° C. (hereafter referred to as ohms/cm.³) and 810 ohms/cm.³ at 25° C., 1000 cycle voltage being used for test.

The composition thus obtained may be employed for impregnating electrolytic capacitors, such as shown in Fig. 1, consisting of aluminum foil armatures 3, 4 separated by spacers 5, 6 of paper or cheesecloth, such as described in Clark et al. Patent No. 2,022,500, patented November 26, 1935. The aluminum armatures are "formed" or oxidized by electrolytic treatment as described in detail in said patent. They are provided, as shown, with projecting terminals 7, 8. In the stack type capacitor of Fig. 2 the armatures 9, 10 are shown in combination with a spacer 11, terminals 12, 13 being provided.

When the described composition is used for impregnating a roll capacitor of the ordinary commercial type which is commonly rated at 130 microfarad capacity, the procedure being described in said prior patent, there is obtained a capacity of about 1 microfarad for each 8.5 square inches of armature surface and a power factor of about 5 at 25° C.

Such capacitors when subjected to continuous heating materially above room temperature, without voltage application, are characterized by remarkable stability. After twenty-two days of heating at 75° C., the power factor is increased to only about 9 per cent (tested at 25° C.), the capacity being substantially unchanged. Subjection of capacitors to elevated temperature without voltage application is a severe test for capacitor stability. A rise in power factor resulting from heating is characteristic of deterioration in a capacitor.

The particular proportions above given are only illustrative and are not an essential feature of my invention. As a second example, a mixture consisting of 14 per cent lactic acid, 36 per cent boric acid and 50 per cent acetamide, by weight, when treated with ammonia gas as above described, results in a product suitable for use as an electrolyte. At 90° C. this product has the resistance of 100 ohms/cm³ and when tested at 25° C. a resistance of 1380 ohms/cm³, the tests being made with 1000 cycle voltage.

As a third example, a composition may be prepared by conducting ammonia gas into a mixture of 4 per cent lactic acid, 36 per cent boric acid and 60 per cent acetamide. The product at 90° C. is characterized by a resistance of 90 ohms/cm.³ and at 25° C. by a resistance of 590 ohms/cm³, (1000 cycle test). The compounds of Examples 2 and 3 are solids at room temperature and thin liquids at 100° C. The impregnation preferably occurs at a temperature of approximately 100° C.

Capacitors consisting of preformed foil armatures and spacers made up of three sheets of .001" of capacitor paper when impregnated with the second mixture are characterized by a power factor at room temperature of 9.6 per cent and a capacity of approximately 1 microfarad for 8.5 square inches of active foil surface. Such capacitors when subjected to heating without voltage application, showed marked stability. The power factor after 10 days of heating at 75° C. was found to be increased to only 10 per cent. The third of the above mixtures when similarly employed and the capacitor impregnated showed when tested at room temperature a power factor of about 10 per cent and when tested at 70° C. a power factor of 8 per cent. The capacity in this case was also about 1 microfarad for approximately 8.5 square inches of active foil surface.

Favorable results of my invention also can be obtained to a somewhat lesser degree by preparing a mixture as above described containing a single ionogen, for example, a borate, in addition to the amide. A mixture of about 36 per cent boric acid and 64 per cent acetamide (Example 4) on treatment with ammonia gas to form ammonium borate, the treatment being carried to a pH value of 7 to 8.0, results in a product suitable for use in electrolytic capacitors.

During the reaction water is formed. If all of the water which is formed were present in the free state then the product would contain about 12.7 per cent of water. However, part of the water appears to be bound as water of crystallization, only about 5 per cent being present as free water. It is believed that three molecules of water become bound to the borate as water of crystallization. The product is solid at room temperature and has a melting point in the range of about 60 to 65° C. It is semi-liquid or mushy material at 100° C. The electrical resistance of this product measured at 1000 cycles was found to be at 90° C., 150 ohms/cm$^3$; at 25° C., 1400 ohms/cm$^3$. The product of Example 4 when employed for impregnating a capacitor made up of preformed aluminum foil armatures and having a spacer consisting of three sheets of .001" condenser tissue as above described and being subjected to the usual curing operations involved in the preparation of 110 volt alternating current capacitors has a capacity at room temperature of approximately 1 microfarad for 8.5 square inches of active foil surface and at 75° C. of 1 microfarad for 8.0 square inches of active foil surface. The power factor at 25° C. is of the order of about 8 per cent. When capacitors containing such electrolyte are heated continuously for 22 days at 75° C., without voltage application the power factor is increased to only about 10 per cent.

As another, and fifth example of my invention, an electrolyte particularly adapted for low voltage direct current, electrolytic capacitors may consist of ammonium borate and formamide. A suitable mixture may comprise by weight 10 parts of ammonium borate and 90 parts of formamide. Such a mixture is a liquid of low viscosity at room temperature and is characterized by a resistance of 68 ohms/cm$^3$ at 90° C. and 340 ohms/cm$^3$ at 25° C. tested at 1000 cycle voltage. The proportion of ammonium borate may be increased to as high as 40 per cent without loss of liquidity at room temperature and without seriously altering the electrical characteristics.

Similarly, formamide can be used with ammonium lactate and ammonium borate. In making up such an electrolyte one may start with a mixture of 32 parts of lactic acid, 36 parts of boric acid and 32 parts of formamide, the ingredients forming a solution. Ammonium gas is passed into the solution at a temperature preferably not higher than 100° C. to a pH value of approximately 7 to 7.5. The product, (Example 6), is a thin clear colorless liquid with a resistance at 90° C. of 37 ohms/cm$^3$ and a resistance at 25° C. of 198 ohms/cm$^3$. A capacitor made up of aluminum foil armatures preformed at 160 volts in accordance with known procedure and containing an absorbent spacer of cheesecloth, paper or the like when impregnated, preferably at a temperature below 100° C. is characterized by a capacity of 1 micro-farad for 8 square inches of active foil surface, a power factor at 110 volts, 60 cycles, 25° C. of less than 5 per cent, averaging about 4.8 per cent. The power factor showed no rise even when such capacitors were heated at 75° C. continuously without voltage for one week. In fact the average power factor after such heating was reduced to 4.6 per cent.

Mixtures of acetamide and formamide together with one or more ionogens can be used. A suitable mixture, (Example 7) may contain by weight 32 per cent of acetamide, 32 per cent formamide and 36 per cent ammonium borate. Capacitors impregnated with such mixture have a power factor less than 6 per cent and a normal capacity of 1 microfarad for 8 square inches of active foil area.

Instead of acetamide, other aliphatic amides may be employed. For example, propionamide, butyramide, lactamide and in general those amides of aliphatic acids containing less than 5 carbon atoms per molecule may be employed as the essential ingredient of electrolyte mixtures in accordance with my invention. It has been found, however, that combinations of formamide and ammonium borate are best suited only for electrolytic capacitors operating at low voltages, for example, for voltages below about 40 volts direct current.

As already indicated, instead of salts of lactic acid, I may use as an ingredient of the compositions embodying my invention salts of other organic acids, such as acetic acid, propionic acid, crotonic acid, butyric and even of acids containing more than 5 carbon atoms, such as stearic acid.

A solid composition suitable for use as electrolyte (Example 8), may be prepared as follows: a mixture comprising by weight, 36 parts of boric acid, 32 parts of stearic and 32 parts of formamide is treated with ammonia as above described to a pH value of approximately 7. The product is a solid at room temperature and has a melting point of 75 to 80° C. At 90° C. the resistivity is approximately 60 ohms/cm$^3$ at 1000 cycles. As the ingredients of the product tend to separate when the product is liquefied, the composition preferably is homogenized by agitation before impregnation.

The power factor of capacitors embodying my invention is a function of the electrical resistivity of the electrolyte contained therein. In the example cited I have described electrolyte compositions containing formamide. Such electrolyte compositions possess low electrical resistivities.

Low resistivity values also can be obtained by adding water to electrolyte compositions of the character herein described. The following composition (Example 9) will illustrate. Chloride-free distilled water is added to a reaction mixture made up of 64 parts (by weight) of acetamide and 36 parts of boric acid until a mixture of the following proportions results:

| | Per cent |
|---|---|
| Acetamide | 61 |
| Boric acid | 34 |
| Water | 5 |

This mixture is treated with ammonia gas ($NH_3$) until a pH of 7.0 to 8 is obtained. The product is a thin, cloudy suspension at 90° C. and a semi-solid mass at 25° C. The electrical resistivity at 90° C. is of the order of 50 to 100 ohms and at 25° C. of the order of 400 to 600 ohms. The total water content is about 19 per cent, including water bound as water of crystallization. Ordinarily less than 15 per cent of water should be added. Water may be used in combination with the other examples above given.

The electrical characteristics of capacitors containing an electrolyte embodying other features of the present invention and also containing water are superior at very low temperatures to an electrolyte made up without the addition of water but otherwise is similar. In observed instances, the capacity was reduced but very little by a reduction of temperature to —10° C. while the power factor at such low temperature was found to be increased only a few per cent. In the electrolytes in the manufacture of which no water was added, a greater reduction of capacity and materially greater rise of power factor (up to 22 per cent) was observed at such low temperature.

While in the described examples of my invention ammonia is the base employed for combining with the acid components, it should be understood that other bases, as for example, sodium or potassium hydroxide may be used. While I prefer to use the ammonium product of the above-described reactions in my electrolyte composition, I do not wish to be restricted thereto. It is to be understood that the use of an ionogen of unreacted acid in combination with an amide is included within the scope of my invention and is so claimed.

What I claim as new and desire to secure by Letters Patent of the United States is:

1. An electrolyte suitable for use with film-forming electrodes consisting substantially wholly of a mixture of an amide of an aliphatic acid containing less than 5 carbon atoms in the molecule, and a film-forming ionogen, compatible with said amide.

2. An electrolyte suitable for use with film-forming electrodes consisting of a mixture of an amide of an aliphatic acid containing less than 5 carbon atoms in the molecule, a compatible film-forming ionogen and a substantial proportion of water.

3. An electrolyte suitable for use with film-forming electrodes consisting of the combination in substantial proportions an amide of an aliphatic acid containing less than 5 carbon atoms in the molecule, a film-forming ionogen compatible with said amide and an ammonium salt of an organic acid.

4. An electrolyte suitable for use with film-forming electrodes consisting essentially of the combination of a preponderant proportion of an amide of an aliphatic acid containing less than 5 carbon atoms in the molecule, a lesser proportion of a film-forming ionogen compatible with said amide and an organic acid.

5. A lfilm-maintaining electrolyte consisting essentially of the combination of substantial proportions respectively of acetamide and an alkali borate.

6. An electrolyte suitable for use with film-forming electrodes consisting essentially of the combination of substantial proportions respectively of acetamide, a film-maintaining ionogen which is compatible therewith and a substantial proportion of water.

7. A film-maintaining electrolyte composition consisting essentially of the combination in substantial proportions an amide of an aliphatic acid containing less than 5 carbon atoms in the molecule, and ammonium borate.

8. An electrolyte composition suitable for use with film-forming electrodes consisting essentially of the combination in substantial proportions an amide of an organic acid containing less than 5 carbon atoms in the molecule, an alkali base borate and an alkali lactate.

9. In an electric capacitor having film-forming armatures an electrolyte consisting essentially wholly of an amide of an aliphatic acid containing less than 5 carbon atoms in the molecule, and a film-forming ionogen compatible with said amide.

10. An electric capacitor comprising the combination of cooperating film-forming armatures, a porous spacer therebetween and an electrolyte permeating said spacer, said electrolyte consisting of a substantial proportion of an amide of an aliphatic acid containing less than 5 carbon atoms in the molecule, a film-forming alkali salt ionogen and at least about 5 per cent of water.

11. An electric capacitor comprising the combination of aluminum armatures, a porous spacer therebetween, and an electrolyte permeating said spacer consisting of a preponderant proportion of acetamide, a lesser proportion of an ammonium borate and more than about 5 per cent of unbound water.

12. An electrolytic capacitor comprising the combination of cooperating film-forming armatures, a spacer therebetween and a composition coating said spacer consisting of substantial proportions of acetamide, an alkali borate and a substantial proportion of water.

13. A film-maintaining electrolye consisting of the combination of substantial proportions respectively of acetamide and ammonium borate.

14. An electrolyte composition suitable for use with film-forming electrodes consisting of the combination in substantial proportions an amide of organic acid containing less than five carbon atoms in the molecule, ammonium borate and ammonium lactate.

15. A film-maintaining electrolyte consisting of the combination of substantial proportions respectively of acetamide, ammonium borate and ammonium lactate.

16. An electrolyte suitable for use with film-forming electrodes comprising an ionogen component and a carrier component consisting preponderantly of an amide of an aliphatic acid containing less than five carbon atoms.

17. An electrolyte composition which is semi-liquid or mushy at 100° C. and consists essentially of the product derived by treating a mixture by weight of about 36 per cent boric acid and 64 per cent acetamide with sufficient ammonia gas to result in a pH value of about 7 to 8.

18. An electrolyte for electrolytic condensers comprising the combination of substantial proportions of formamide and an alkali borate.

FRANK M. CLARK.

CERTIFICATE OF CORRECTION.

Patent No. 2,165,091. July 4, 1939.

FRANK M. CLARK.

It is hereby certified that error appears in the printed specification of the above numbered patent requiring correction as follows: Page 3, first column, line 73, claim 5, for "lfim" read film; same page, second column, line 18, claim 8, strike out the word "base"; line 47, claim 13, for "electrolye" read electrolyte; and that the said Letters Patent should be read with this correction therein that the same may conform to the record of the case in the Patent Office.

Signed and sealed this 22nd day of August, A. D. 1939.

Leslie Frazer (Seal)                     Acting Commissioner of Patents.